Dec. 31, 1940.　　　　　M. SEPKO　　　　　2,227,204
SAFETY DEVICE FOR AIRPLANES
Filed Oct. 17, 1939　　　4 Sheets-Sheet 1
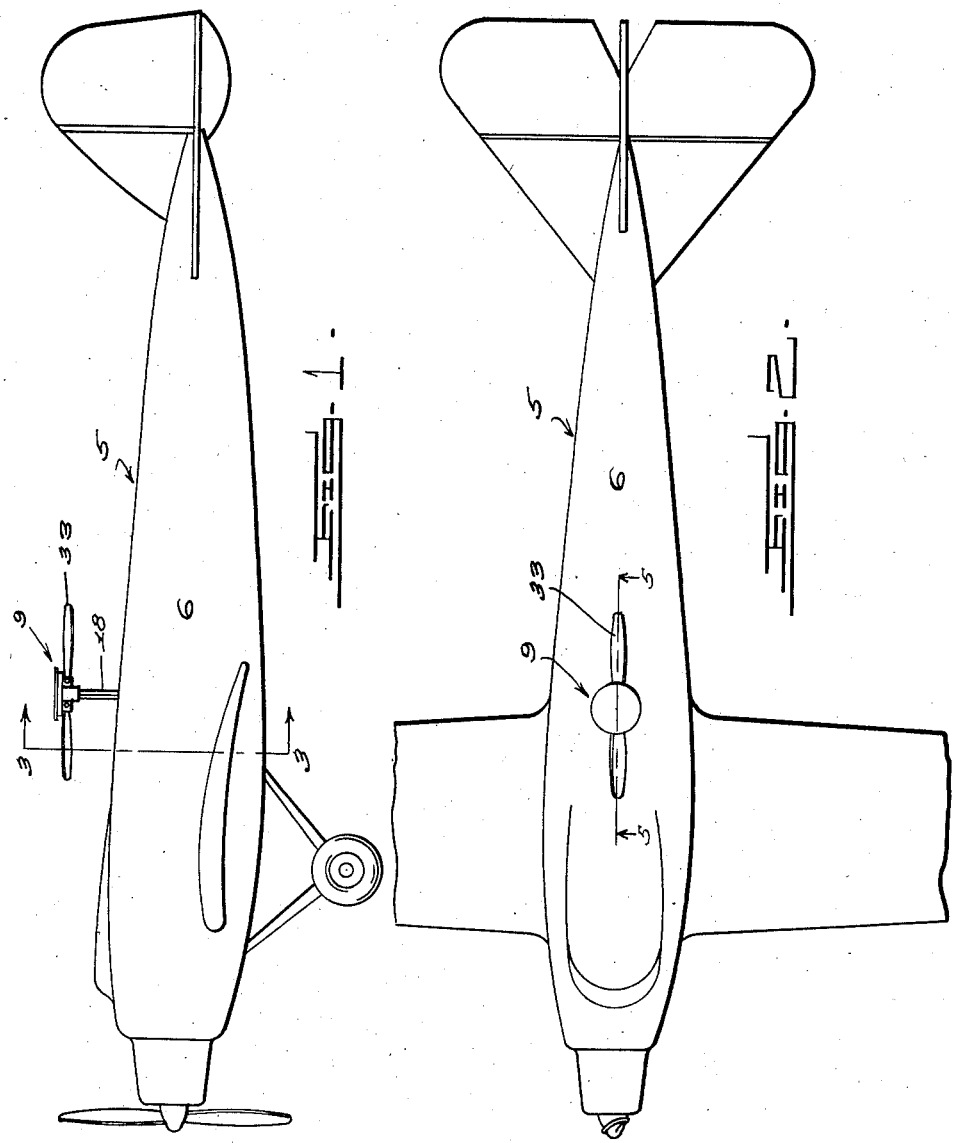
Inventor
MIKE SEPKO,
By *Clarence A. O'Brien*
and *Hyman Berman*
Attorneys

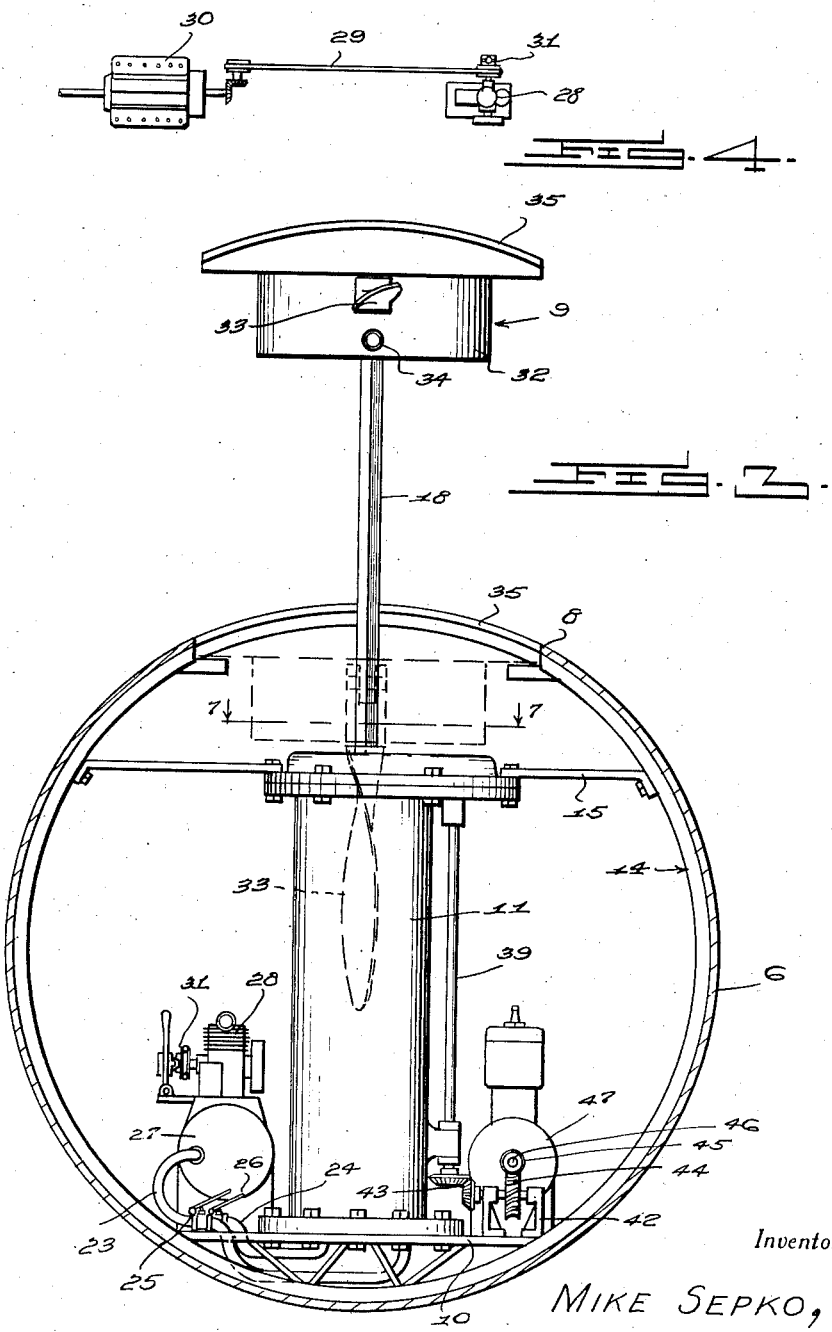

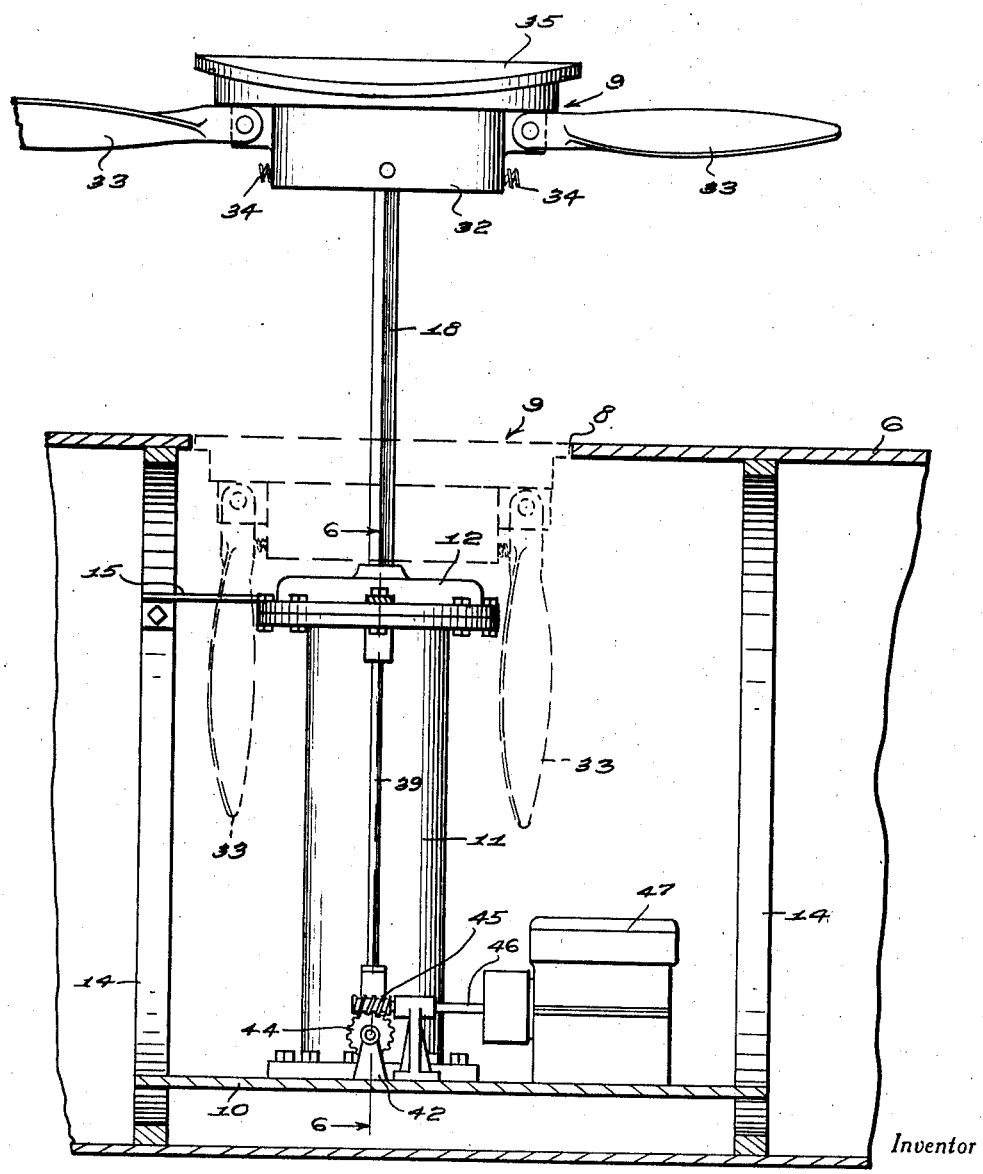

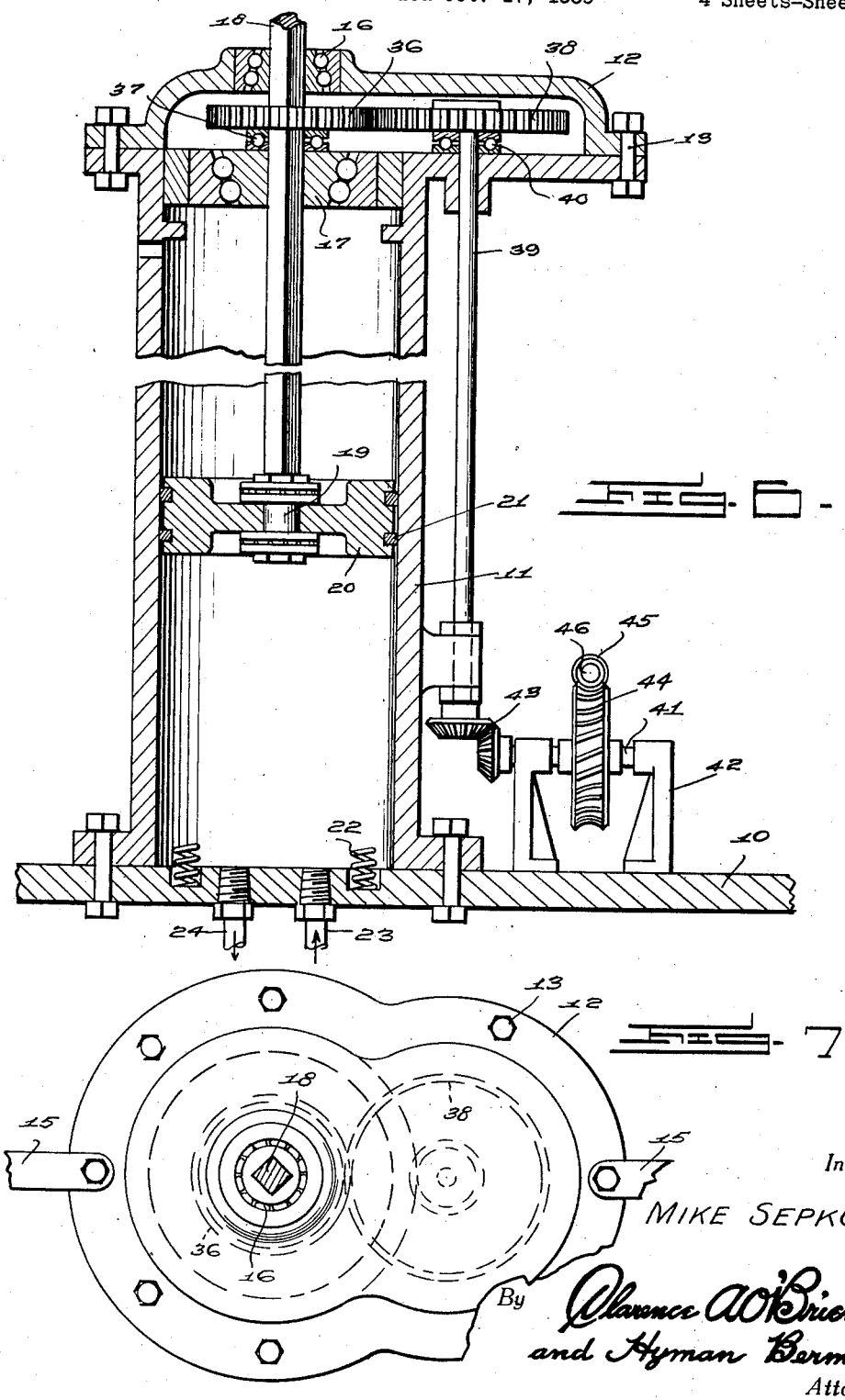

Patented Dec. 31, 1940

2,227,204

UNITED STATES PATENT OFFICE 2,227,204

SAFETY DEVICE FOR AIRPLANES

Mike Sepko, McKeesport, Pa., assignor of one-half to Mike Kozak, McKeesport, Pa.

Application October 17, 1939, Serial No. 299,875

3 Claims. (Cl. 244—139)

This invention relates to a safety device for airplanes, and has for the primary object the provision of a device of this character which may be easily installed on an airplane and normally is confined within the body of said airplane so as not to offer resistance or any form of interference to the airplane under normal performance of the airplane in flight or when ascending or descending. However, should the airplane lose altitude, due to engine failure, the present invention may be quickly brought into operation exteriorly of the body to sustain said airplane in flight and permit the safe landing thereof.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating an airplane equipped with a safety device constructed in accordance with my invention and showing the same in an operative position for sustaining the airplane in flight.

Figure 2 is a fragmentary top plan view illustrating the same.

Figure 3 is a sectional view taken on the line 3—3 of Figure 1.

Figure 4 is a diagrammatical view showing a drive mechanism between an air compressor and the power source of the airplane.

Figure 5 is a sectional view taken on the line 5—5 of Figure 2.

Figure 6 is a sectional view taken on the line 6—6 of Figure 5.

Figure 7 is a sectional view taken on the line 7—7 of Figure 3.

Referring in detail to the drawings, the numeral 5 indicates an airplane of any well known construction and the body 6 thereof is provided with an opening 8 in the top wall thereof for the purpose of permitting the helicopter 9, forming a part of the present invention, to move into and out of the body. The location of the opening should be at a selected distance between the nose and tail of the airplane so that the latter will be properly balanced while being sustained in flight by the helicopter 9.

A supporting base 10 is mounted in the body 6 directly under the opening 8 and has mounted thereon a cylinder 11 arranged vertically and has the upper end thereof closed by a combined head and gear housing 12. Said combined head and gear housing is detachably secured on the cylinder by bolts 13 and also is attached to the framework 14 of the airplane body 6 by braces 15. The combined head and gear housing supports an anti-friction bearing 16 in alignment with the cylinder and also an anti-friction bearing 17 is supported in the upper end of the cylinder and in alignment with the bearing 16. The bearings 16 and 17 are constructed to slidably receive and rotatably support a shaft 18. The shaft has angularly related faces and the openings in the bearings which receive said shaft have faces to match the faces of the shaft so that said shaft may slide vertically. The helicopter 9 is secured to the upper end of said shaft while the lower end of said shaft is received in a bearing 19 which forms a rotatable support for said shaft in a piston 20 and also acts as a thrust bearing for said shaft. The piston is slidable in the cylinder and is equipped with piston rings 21 to prevent leakage between the piston and the cylinder. Shock absorbing springs 22 are mounted in the lower end of the cylinder to prevent damage to the piston when the latter moves downwardly in close proximity to the lower end of the cylinder. Said lower end of the cylinder has connected thereto intake and exhaust pipes 23 and 24.

Self-closing valves 25 are connected in said pipes 23 and 24 and are operated into open positions by foot pedals 26 connected thereto. The exhaust pipe 24 opens to the atmosphere when the respective valve thereof is in an open position while the intake pipe 23 connects to an air pressure tank 27 suitably mounted on the base 10. An air compressor 28 is supported by the tank 27 and is belted, as shown at 29, to the engine 30 of the airplane used in the propulsion of said airplane. A clutch 31 is employed for disconnecting and connecting the air compressor to the belting arrangement so that the compressor may be rendered operative and inoperative as desired. Air under pressure is stored in the tank 27 and by opening the valve 25 of the intake pipe 23, air under pressure will be admitted to the cylinder 11 for the purpose of forcing the piston 20 upwardly and sustaining said piston in an elevated position when the valve 25 of said intake pipe is permitted to close.

The helicopter 9 consists of a hub 32 secured on the shaft 18 and has hinged thereto sustaining blades or wings 33 which are adapted to assume horizontal position on rotation of the shaft 18 due to centrifugal action. During non-rotation of the shaft 18 the blades or wings assume a depending position and engage with cushion springs 34 carried by the hub 32 and the latter also carries a cap 35 which acts as a closure for the opening 8 in the body of the airplane when the device is inoperative or confined within the body of the airplane.

A gear 36 has an opening to match the faces of the shaft 18 and is slidably mounted on the latter being supported by a thrust bearing 37 mounted on the bearing 17. The gear 36 meshes with a gear 38 and the latter is secured on a shaft 39 which parallels the cylinder and is arranged exteriorly thereof. A thrust bearing 40 is supported by the combined head and gear box and in turn supports the gear 38. A driven shaft 41 is rotatably supported by supports 42 arranged on the base 10 and is connnected to the shaft 39 by bevel gears 43. The driven shaft 41 has a worm gear 44 secured thereto which in turn meshes with a worm 45 secured on a power take-off shaft 46 of an auxiliary engine 47 mounted on the base 10. It is to be understood that the engine 47 is entirely independent of the engine 30 used in the propulsion of the airplane and is supplied with fuel from a separate source (not shown) from the source of fuel to the engine 30 and may be equipped with controls and a starter so that it may be brought into operation at any time desired. With the engine 47 in operation the shaft 18 is caused to rotate and with the helicopter supported exteriorly of the body of the airplane it will sustain the latter in flight and by controlling the speed of the engine 47 the airplane can be gradually brought to a safe landing by decreasing the speed of operation of the engine 47.

It is to be understood that air is stored in the tank 27 during normal use of the airplane. The storing of the air in the tank 27 is brought about by driving the compressor 28 by the engine 30 used in the propulsion of the airplane. Normally the piston 20 is allowed to assume a lowered position resting on the shock absorbing springs 22 which brings the helicopter within the body of the airplane with the cap 35 thereof closing the opening 8 so that no interference will be afforded by the present invention to the normal operation or flight of the airplane. However, should the airplane lose altitude due to failure of the engine 30 to operate, the pilot immediately admits air pressure to the cylinder forcing the helicopter 9 to an extended position above the body of the airplane and then immediately starts the engine 47 which drives the helicopter so that the latter will sustain the airplane in flight. By controlling the engine 47 or decreasing the speed thereof the pilot may safely land the airplane.

It is believed that the foregoing description, when taken in connection with the drawings, will fully set forth the construction and advantages of this invention to those skilled in the art to which such a device relates, so that further detailed description will not be required.

Having described the invention, I claim:

1. In combination with an airplane having a body provided with an opening, a cylinder mounted in said body, a piston slidable in said cylinder, a shaft rotatably connected to said piston, a helicopter including pivoted blades and a hub carrying a cap secured on said shaft and normally positioned so that the cap closes the opening of the body, pneumatic means connected to said cylinder for forcing the piston upwardly and sustaining said piston in an elevated position to dispose the helicopter exteriorly of the body, an exhaust means connected to the cylinder for the lowering of the piston and the helicopter into the body of the airplane, and power means for rotating the shaft.

2. In combination with an airplane having a body provided with an opening, a cylinder mounted in said body, a piston slidable in said cylinder, a shaft rotatably connected to said piston, a helicopter including pivoted blades and a hub carrying a cap secured on said shaft and normally positioned so that the cap closes the opening of the body, pneumatic means connected to said cylinder for forcing the piston upwardly and sustaining said piston in an elevated position to dispose the helicopter exteriorly of the body, an exhaust means connected to the cylinder for the lowering of the piston and the helicopter into the body of the airplane, said shaft having squared faces, a gear having a squared opening to match the faces of the shaft, a head for closing said cylinder, bearings carried by said head for rotatably and slidably supporting said shaft, a thrust bearing supported by one of the first-named bearings for the support of said gear, a second gear meshing with the first gear, a shaft journaled in the head and connected to the second gear and extending parallel to the cylinder, a power source in said body, and means for connecting the power source to the second shaft.

3. In combination with an airplane having a body including a top wall provided with an opening, a cylinder in said body, means for supporting the cylinder in vertical alignment with the opening, a piston slidable in said cylinder, a shaft connected to said piston for movement through the opening, a helicopter including pivoted blades and a hub secured to said shaft, means on said hub to limit the pivotal movement of the blade to provide a closure for the opening, and fluid pressure means connected to said cylinder for the actuation of the piston.

MIKE SEPKO.